United States Patent [19]

Robbins, III et al.

[11] Patent Number: 5,791,528

[45] Date of Patent: Aug. 11, 1998

[54] CLEAR PLASTIC MEASURING/DISPENSING SPOUT FOR A BOX-LIKE CONTAINER

[75] Inventors: Edward S. Robbins, III, 2802 E. Avalon Ave., Muscle Shoals, Ala. 35661; Ted A. Bell, Killen, Ala.

[73] Assignee: Edward S. Robbins, III, Muscle Shoals, Ala.

[21] Appl. No.: 791,677

[22] Filed: Jan. 30, 1997

Related U.S. Application Data

[63] Continuation of Ser. No. 589,587, Jan. 22, 1996, abandoned, which is a continuation of Ser. No. 477,664, Jun. 7, 1995, abandoned, which is a continuation of Ser. No. 117,677, Sep. 8, 1993, abandoned.

[51] Int. Cl.$^6$ .................................................. B65D 51/16
[52] U.S. Cl. ........................ 222/364; 222/535; 222/566; 229/125.15
[58] Field of Search .................................. 222/158, 364, 222/444, 456, 531, 535, 157, 569, 566, 573, 556; 229/125.11, 162, 125.15

[56] References Cited

U.S. PATENT DOCUMENTS

| | | | |
|---|---|---|---|
| 917,649 | 4/1909 | Otto | 222/545 |
| 924,533 | 6/1909 | Compton et al. | |
| 928,022 | 7/1909 | Boland et al. | 222/362 X |
| 1,268,901 | 6/1918 | Weil | 222/531 |
| 1,273,012 | 7/1918 | Souther | 222/456 |
| 1,411,000 | 3/1922 | Condon | 222/364 X |
| 1,619,315 | 3/1927 | Ricketts | 222/364 |
| 1,710,119 | 4/1929 | Smith | 222/364 X |
| 1,714,368 | 5/1929 | Hobson | |
| 1,752,527 | 4/1930 | Howard | 222/364 |
| 1,802,284 | 4/1931 | Stoddard | 222/572 |
| 1,965,233 | 7/1934 | Guyer | 222/531 X |
| 1,967,448 | 7/1934 | Olson | 222/364 |
| 2,069,281 | 2/1937 | Sebreny | 229/130 X |
| 2,102,877 | 12/1937 | Barnett | 222/364 |
| 2,205,129 | 6/1940 | Barnett | 222/364 |
| 2,214,437 | 9/1940 | Punte et al. | 206/42 |
| 2,311,255 | 2/1943 | Read | 222/531 |
| 2,370,820 | 3/1945 | Stott | 222/456 |
| 2,449,285 | 9/1948 | Ekstrom | 222/548 |
| 2,610,770 | 9/1952 | Penfield | 222/364 |
| 2,613,856 | 10/1952 | Ely | 222/531 X |
| 2,781,156 | 2/1957 | Wallo | 222/531 |
| 2,784,884 | 3/1957 | Borie, Jr. | 222/336 |
| 2,786,612 | 3/1957 | Gallo | 222/531 |
| 2,804,103 | 8/1957 | Wall | 141/381 |
| 2,811,281 | 10/1957 | Donovan | 222/81 |
| 2,840,124 | 6/1958 | Greene | 222/212 |
| 2,844,266 | 7/1958 | Hofe | 215/244 |
| 2,898,004 | 8/1959 | Klausmann | 222/364 |
| 2,943,769 | 7/1960 | Klausmann et al. | 222/364 |
| 3,020,659 | 2/1962 | Paulini | 40/307 |
| 3,033,420 | 5/1962 | Thomas et al. | 222/1 |
| 3,057,524 | 10/1962 | Shanks | 222/430 |
| 3,140,799 | 7/1964 | Mehr | 222/519 X |
| 3,144,180 | 8/1964 | Phillipps et al. | 222/480 |
| 3,168,223 | 2/1965 | Gapeis | 222/158 |
| 3,187,961 | 6/1965 | Moore | 222/364 |

(List continued on next page.)

FOREIGN PATENT DOCUMENTS 20837  9/1929  Netherlands .......................... 222/364

Primary Examiner—Andres Kashnikow
Assistant Examiner—Lisa Ann Douglas
Attorney, Agent, or Firm—Nixon & Vanderhye P.C.

[57] ABSTRACT

A measuring and dispensing spout is provided for use with a container having a panel with an opening therein. The measuring and dispensing spout includes a front face, a pair of side faces and a rear face, formed to provide an open-topped hopper. The spout is mounted within the opening of the panel for pivoting movement between open and closed positions. At least the front face of the open-topped hopper is of substantially transparent material with volumetric indicia thereon, to enable a user to visually confirm the amount of container contents within the spout, even when the spout is closed.

8 Claims, 7 Drawing Sheets

U.S. PATENT DOCUMENTS

| | | | |
|---|---|---|---|
| 3,209,961 | 10/1965 | Wassell | 222/158 X |
| 3,217,940 | 11/1965 | Fahn et al. | 222/199 X |
| 3,237,835 | 3/1966 | Sternau | 222/531 X |
| 3,353,725 | 11/1967 | Caceres | 222/456 |
| 3,424,355 | 1/1969 | Blumen | 222/450 |
| 3,486,665 | 12/1969 | La Croce | 222/480 |
| 3,511,416 | 5/1970 | Michie | 222/305 |
| 3,831,833 | 8/1974 | Dressler et al. | 229/17 M |
| 3,860,111 | 1/1975 | Thompson | 206/534 |
| 3,921,862 | 11/1975 | Holmstrom | 222/305 |
| 3,948,105 | 4/1976 | Johnson, Jr. | 73/427 |
| 4,069,935 | 1/1978 | Hampel | 215/203 |
| 4,083,467 | 4/1978 | Mullins et al. | 220/90.4 |
| 4,111,351 | 9/1978 | Mackiernan | 229/17 M |
| 4,144,989 | 3/1979 | Joy | 222/438 |
| 4,164,301 | 8/1979 | Thayer | 220/253 |
| 4,261,483 | 4/1981 | Dutcher | 222/364 |
| 4,292,846 | 10/1981 | Barnett | 73/427 |
| 4,346,823 | 8/1982 | Eppenbach | 222/443 |
| 4,376,497 | 3/1983 | Mumford | 222/153 |
| 4,399,928 | 8/1983 | Klingler | 220/335 |
| 4,544,063 | 10/1985 | Neward | 206/540 |
| 4,580,687 | 4/1986 | Lewis | 215/237 |
| 4,606,481 | 8/1986 | Conti et al. | 222/562 |
| 4,610,371 | 9/1986 | Karkiewicz | 220/266 |
| 4,613,057 | 9/1986 | Sacchetti et al. | 221/265 |
| 4,635,828 | 1/1987 | Kaufman | 222/185 |
| 4,643,881 | 2/1987 | Alexander et al. | 422/265 |
| 4,691,821 | 9/1987 | Hofmann | 206/469 |
| 4,693,399 | 9/1987 | Hickman et al. | 222/480 |
| 4,714,181 | 12/1987 | Kozlowski et al. | 222/480 |
| 4,760,938 | 8/1988 | Wenger | 222/531 |
| 4,802,597 | 2/1989 | Dubach | 215/307 |
| 4,898,292 | 2/1990 | VerWeyst et al. | 215/237 |
| 4,930,688 | 6/1990 | Arona-Delonghi | 222/484 |
| 4,936,494 | 6/1990 | Weidman | 222/480 |
| 4,955,513 | 9/1990 | Bennett | 222/480 |
| 4,961,521 | 10/1990 | Eckman | 222/158 |
| 5,002,208 | 3/1991 | Towery | 222/438 |
| 5,011,048 | 4/1991 | Mark | 222/455 |
| 5,012,959 | 5/1991 | Gordon | 229/125.15 X |
| 5,064,106 | 11/1991 | Butler et al. | 222/456 |
| 5,085,331 | 2/1992 | Groya et al. | 215/245 |
| 5,139,181 | 8/1992 | VerWeyst | 222/480 |

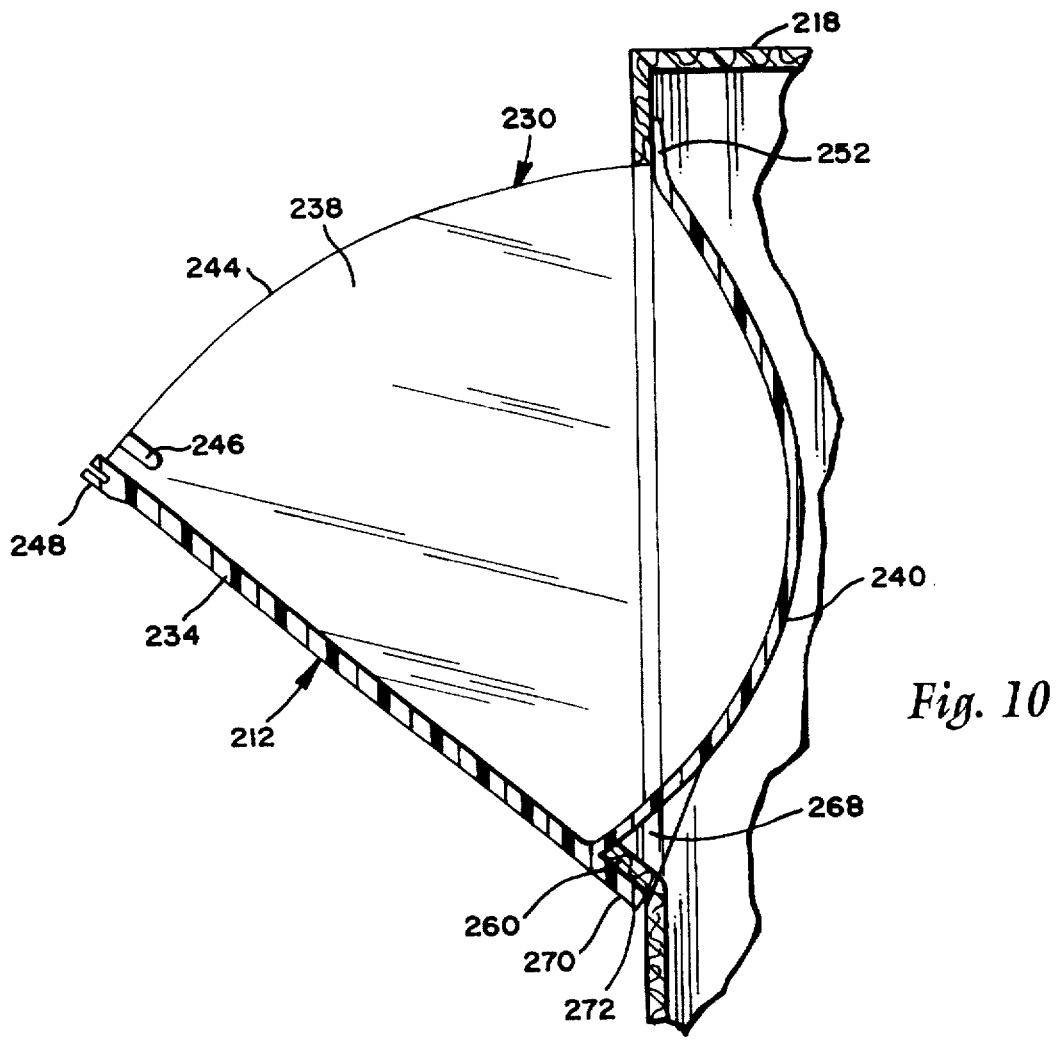
Fig. 10
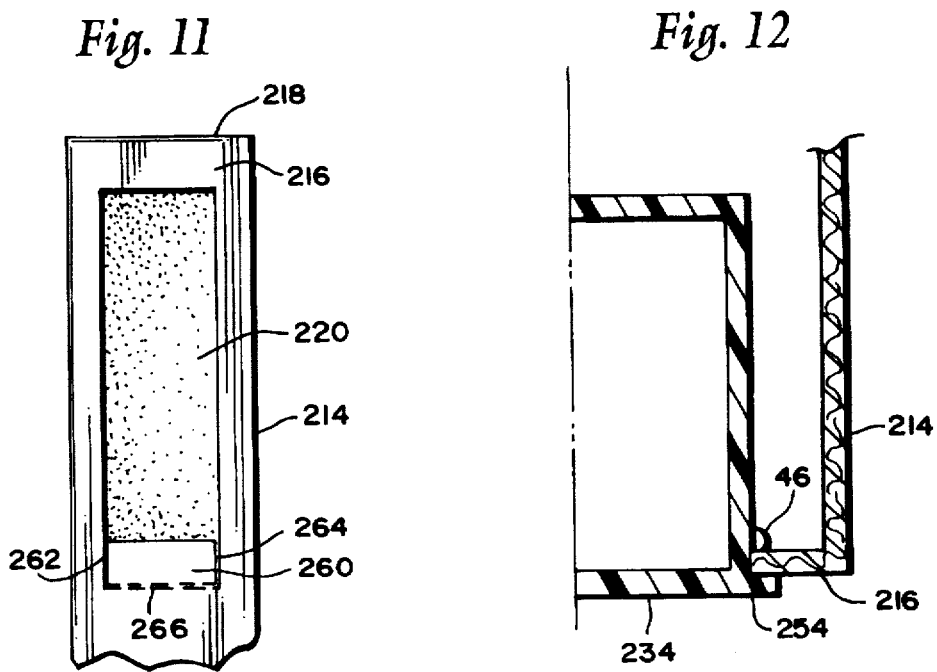
Fig. 11
Fig. 12

CLEAR PLASTIC MEASURING/DISPENSING SPOUT FOR A BOX-LIKE CONTAINER

This is a continuation of 08/589,587, filed Jan. 22, 1994, now abandoned, which in turn is a continuation of application Ser. No. 08/477,664, filed Jun. 7, 1995, now abandoned, which is a continuation of application Ser. No. 08/117,677, filed Sep. 8, 1993, now abandoned.

This invention relates generally to dispensing containers or boxes and specifically, to a substantially transparent or clear plastic spout which enables the user to visually determine the amount of material to be dispensed from the container or box.

BACKGROUND AND SUMMARY OF THE INVENTION

It is, of course, well known to utilize dispensing spouts on containers or boxes, and indeed, most people are familiar with the metal pour spouts attached to top or side panels of salt containers, powdered detergent boxes and the like. Various attempts have also been made to combine measuring and dispensing functions within a single spout. An early example of this type of measuring/dispensing spout may be seen in U.S. Pat. No. 1,967,448. A disadvantage of the dispensing spout in the '448 patent is that the user cannot adjust the amounts dispensed from the container, nor can the user visually inspect the spout hopper to determine the amount of contents in the hopper without first opening the spout.

Another example of a combined dispensing/measuring spout may be found in U.S. Pat. No. 2,943,769. This spout has the same limitations and disadvantages as the spout disclosed in the '448 patent.

A measuring/dispensing spout is disclosed in U.S. Pat. No. 3,511,416 which incorporates a variable volume hopper, utilizing a movable divider or partition between front and rear walls of the hopper. This is a rather cumbersome construction which, again, requires the spout to be open in order for the user to determine the amount of contents, if any, within the hopper. In addition, the user must rely upon the accurate placement of the partition or divider in order to dispense accurately measured amounts.

U.S. Pat. No. 3,921,862 discloses a measuring pour spout for installation on a carton or box which utilizes a vertically adjustable slide as the rear wall of the hopper. The slide is vertically adjustable by means of a knob protruding through the front side of the box. Here again, this is an overly complex construction which is subject to clogging and inaccurate measurement. Moreover, as with the previously described devices, the user cannot visually confirm the material within the hopper unless the spout is opened.

U.S. Pat. No. 5,002,208 discloses a box with a built-in measuring dispenser wherein the spout hopper has a rear wall which is adjustable by means of a dial mounted on the outside of the box. The complexity and apparent expense of this construction, along with the inability of the user to visually confirm the amount of material within the hopper, renders this device commercially impractical.

Despite the high level of activity in this area, there has yet to be developed a simple, low cost, one-piece measuring/ dispensing spout which permits the user to dispense various accurately measured amounts of container contents, while at the same time, permitting the user to visually confirm the amount of material to be dispensed without having to first open the spout, or allowing the user to adjust measured amounts in relation to predetermined graduations, e.g., more or less than a measured graduation.

It is the principal objective of this invention to provide a measuring/dispensing spout which overcomes the deficiencies of the prior art constructions discussed above. Thus, in an exemplary embodiment of the invention, a one-piece, integrally molded measuring/dispensing spout is provided which includes a front face, a pair of parallel side faces, and a rear face or wall which is curved (or other geometric shape dictated by volume requirements) to intersect the front face along the lower edge thereof, to thereby provide an open-topped hopper. In one exemplary embodiment, the spout includes an integrally molded-in frame comprising a substantially flat, outer frame which extends about the periphery of a die-cut opening in an end panel of the box, and which lies flush against the end panel. The frame also includes substantially parallel side angle portions which extend vertically along the sides of the die-cut opening, parallel with the side panels of the box. In this embodiment, the frame is received in the die-cut opening and cemented to the box end panel by suitable adhesive. The measuring/dispensing spout is integrally hinged to the frame along a living hinge (i.e., an integral thinned area) extending along the lower horizontal edge of the frame. The parallel side faces of the open-topped hopper are provided with single snap projections which snap past the frame side faces to releasably retain the spout in a closed position.

Significantly, the measuring/dispensing spout is molded of a clear or transparent plastic material, and the front face is provided with measurement indicia which enable the user to precisely visually determine the amount of material within the spout hopper which will be dispensed from the box, even while the spout remains closed.

In use, with the spout in a closed position, the user simply tilts or partially inverts the box to thereby fill or partially fill the open-topped hopper with contents. By manipulating the box, the user is able to transfer the precise amount of material from the box to the hopper, aided by the indicia on the front face of the spout. If too much material has entered the hopper, the user can simply tilt or shake the box to transfer material out of the hopper and back into the box proper. At all times, the user may ascertain the exact amount of material within the hopper by reason of the clear plastic construction of the spout.

In alternative embodiments of the invention, different mounting arrangements are provided by which the spout is attached within a die-cut opening of a box-like container. These alternative arrangements will be described in greater detail further herein.

In its broader aspects, the invention comprises a measuring and dispensing spout for use with a container which includes a panel having an opening therein, the measuring and dispensing spout comprising a front face, a pair of side faces and a rear face, formed to provide an open-topped hopper, and including means for mounting said spout in the opening of the panel for pivoting movement between open and closed positions; at least said front face of said open-topped hopper being of substantially transparent material with volumetric indicia thereon.

In another aspect, the invention relates to a dispensing box comprising a pair of side panels, a pair of end panels, and top and bottom panels, one of the panels having an opening formed therein; and a measuring and dispensing spout secured in the opening, the measuring and dispensing spout comprising a front face, a pair of side faces and a rear face, formed to provide an open-topped hopper, and including means for mounting the spout in the opening of the one panel for pivoting movement between open and closed positions, as least the front face of the open-topped hopper being of substantially transparent material with volumetric indicia thereon.

From the above, it will be appreciated that the invention described herein provides a simple, economical and easy-to-use dispensing/pouring spout of a type heretofore unavailable to the consumer. Because of its relative simplicity and low cost, the present invention provides a commercially viable solution to problems associated with prior dispensing/measuring spout constructions. Other objects and advantages of the present invention will become apparent from the detailed description which follows.

BRIEF DESCRIPTION OF THE DRAWINGS

FIG. 10 is a partial side section of the box-like container and associated pouring/dispensing spout shown in FIG. 9;

FIG. 11 is a partial end view of the box illustrated in FIG. 9, with the pouring/measuring spout removed; and FIG. 12 is a partial top section similar in orientation to FIG. 11, but illustrating an alternative construction in accordance with the invention.

DETAILED DESCRIPTION OF THE DRAWINGS

Figure 1:
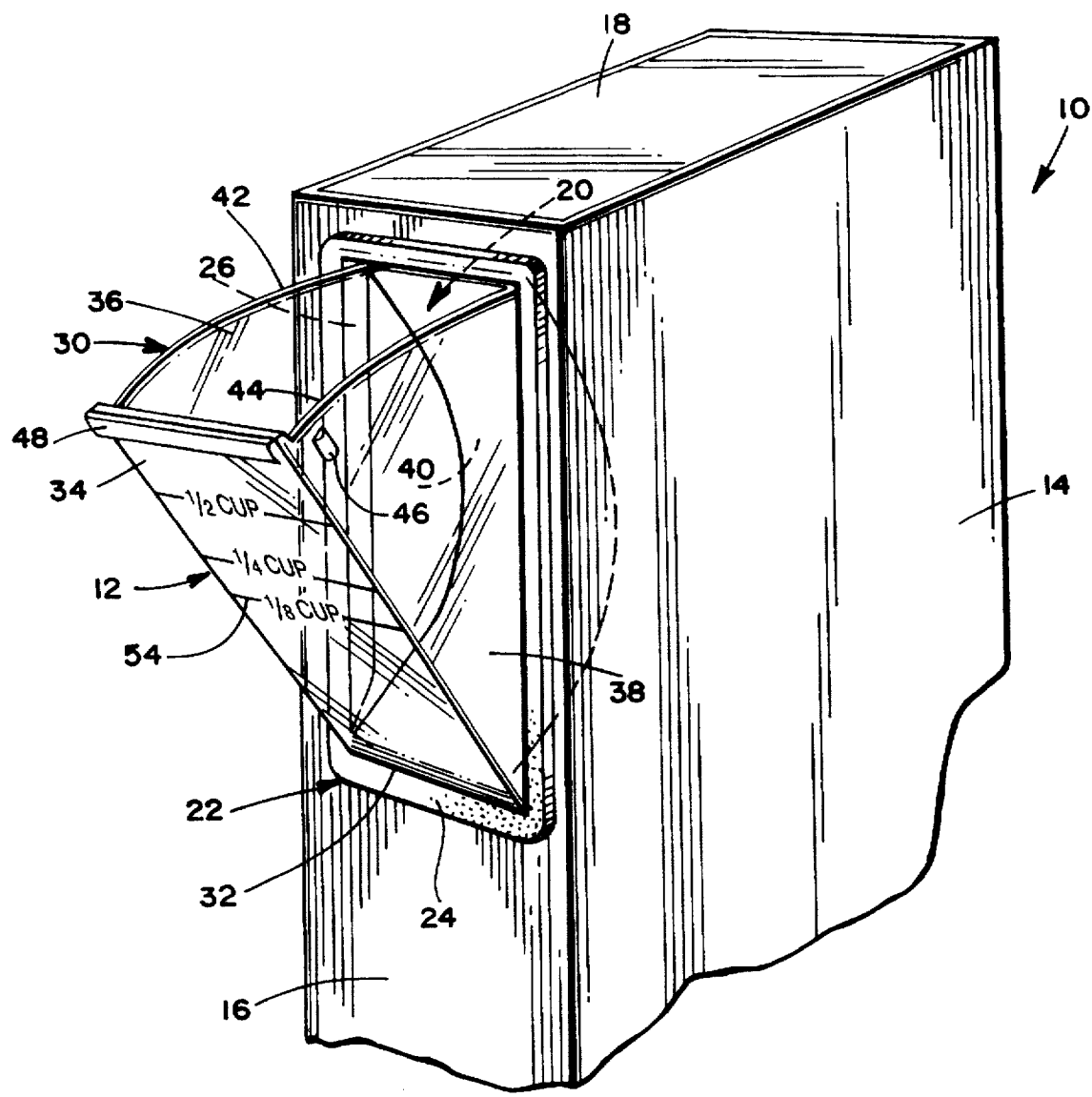
FIG. 1 is a partial perspective view of a box-like container and associated measuring/dispensing spout in accordance with a first exemplary embodiment of the invention, with the spout in an open position.

With reference to FIG. 1, a box-like container 10 is shown to incorporate a tilt-out measuring/dispensing spout 12 in accordance with this invention. The box 10 is of typical cardboard construction and includes a pair of side panels 14 (one shown), a pair of end panels 16 (one shown), a top panel 18 and a bottom panel (not shown). The side panel 16 is die cut to provide a rectangular opening 20 in which the measuring/dispensing spout 12 is seated. It will be appreciated that the invention described herein is equally applicable to other container constructions as well. In the specifically described example, it will also be appreciated that the spout may be mounted in any of the box panels.

Figure 2:
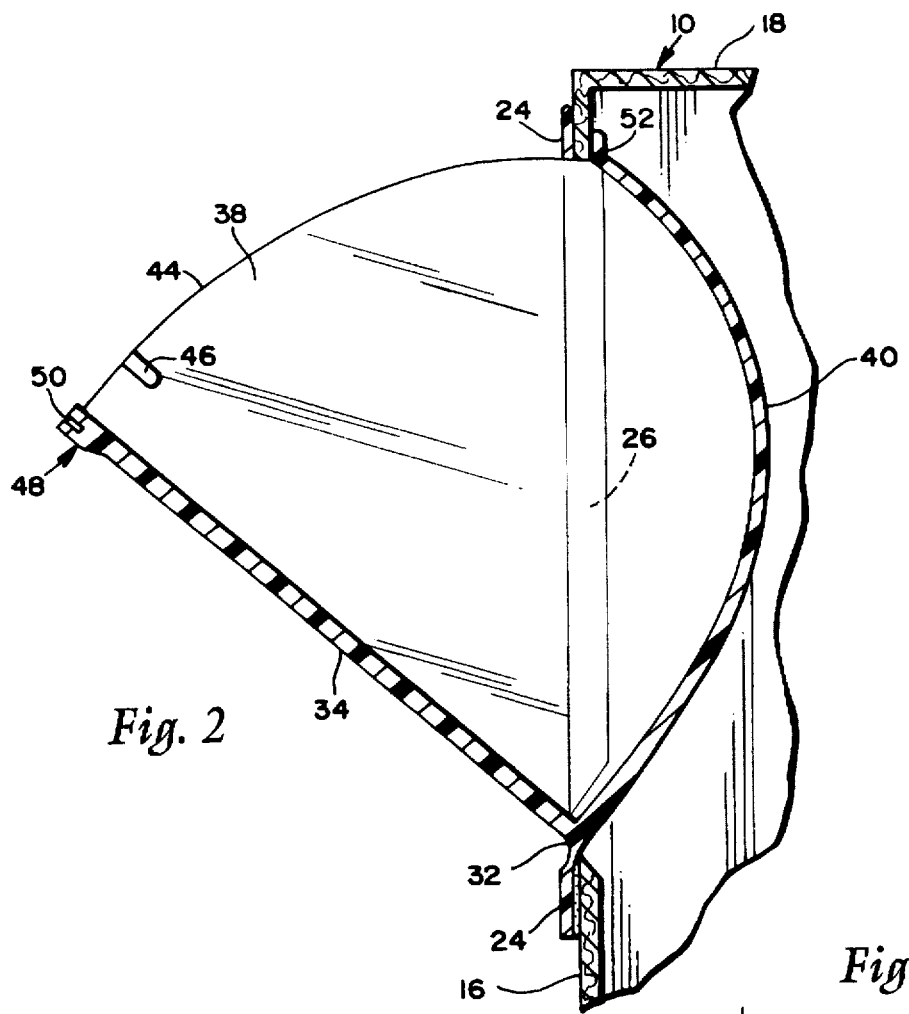
FIG. 2 is a partial side section of the box-like container and associated measuring/dispensing spout illustrated in FIG. 1.
Figure 3:
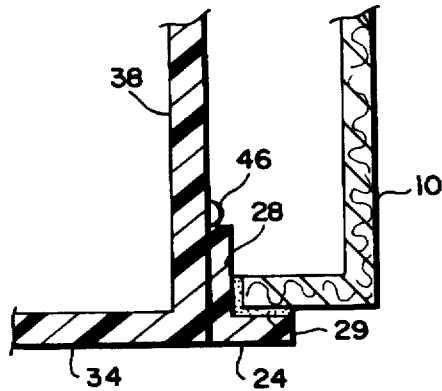
FIG. 3 is a partial top section of the container and associated measuring/dispensing spout illustrated in FIG. 1A.

In the embodiment illustrated in FIGS. 1–3, the measuring/dispensing spout 12 includes an integrally molded-in, rectangular frame 22 which includes a substantially flat, outer frame 24 which extends about the periphery of the rectangular opening 20 and which lies flush against the end panel 16. The frame 22 also includes substantially parallel side angle portions 26, 28 which extend vertically along the sides of the opening 20, parallel with the side panels 14. In the exemplary embodiment, the frame 22 is received in the opening 20 and cemented to the box end panel 16 by any suitable adhesive, applied as shown at 29 in FIG. 3.

The measuring/dispensing spout 12 includes an open-topped hopper 30 integrally hinged to the frame 22 along a "living hinge" 32 extending along the lower horizontal edge of the outer frame 24. The hopper 30 is formed by a flat front face 34, a pair of parallel side faces 36, 38, and a curved rear wall 40 which curves to intersect the front face 34 adjacent the hinge 32. The rear wall 40 thus also functions as a bottom wall for the hopper. The side faces 36, 38 are provided with radiused upper edges 42, 44, respectively, which permit the measuring/dispensing hopper 30 to move between open and closed positions, pivoting about the living hinge 32. The parallel side faces 36, 38, are each provided with a single snap projection 46 (one shown), which snap passed the frame side faces 26, 28 to releaseably retain the spout 12 in a closed position as explained in greater detail below.

The upper edge 48 of the front face 34 extends upwardly beyond the opening defined by the frame 24, so that the edge 48 serves as a stop, preventing movement of the front face 34 into the box 10 upon closing of the spout 12 to the position shown in 1A. In addition, the upper edge 48 (also referred to herein as a "gripping bar") is formed with a narrow upwardly opening groove 50, best seen in FIG. 2, which allows the user to insert his or her fingernail into the slot to facilitate opening of the spout 12 to the position shown in FIG. 1. As best seen in FIG. 2, the rear wall 40 has a similar extended edge at 52 (FIG. 3) which limits opening movement of the spout by engaging the interior surface of the end panel 16, along the upper horizontal edge of the opening 20.

It is a significant feature of this invention that the measuring/dispensing spout 12 be constructed of a molded clear (or transparent) plastic material, and that the front face 34 be provided with measurement indicia 54 (which can wrap around the side faces 36, 38 if desired) which enable the user to precisely determine the amount of material within the hopper 30 with the aid of indicia 54, even while the spout 12 is in the closed position.

In the exemplary embodiment, indicia 54 include measurement lines indicating ⅛ cup, ¼ cup and ½ cup, a particularly useful measurement scheme for powdered detergents. Depending on the size of the box 10, and the typically dispensed amounts, the volumetric indicators may vary.

Figure 1A:
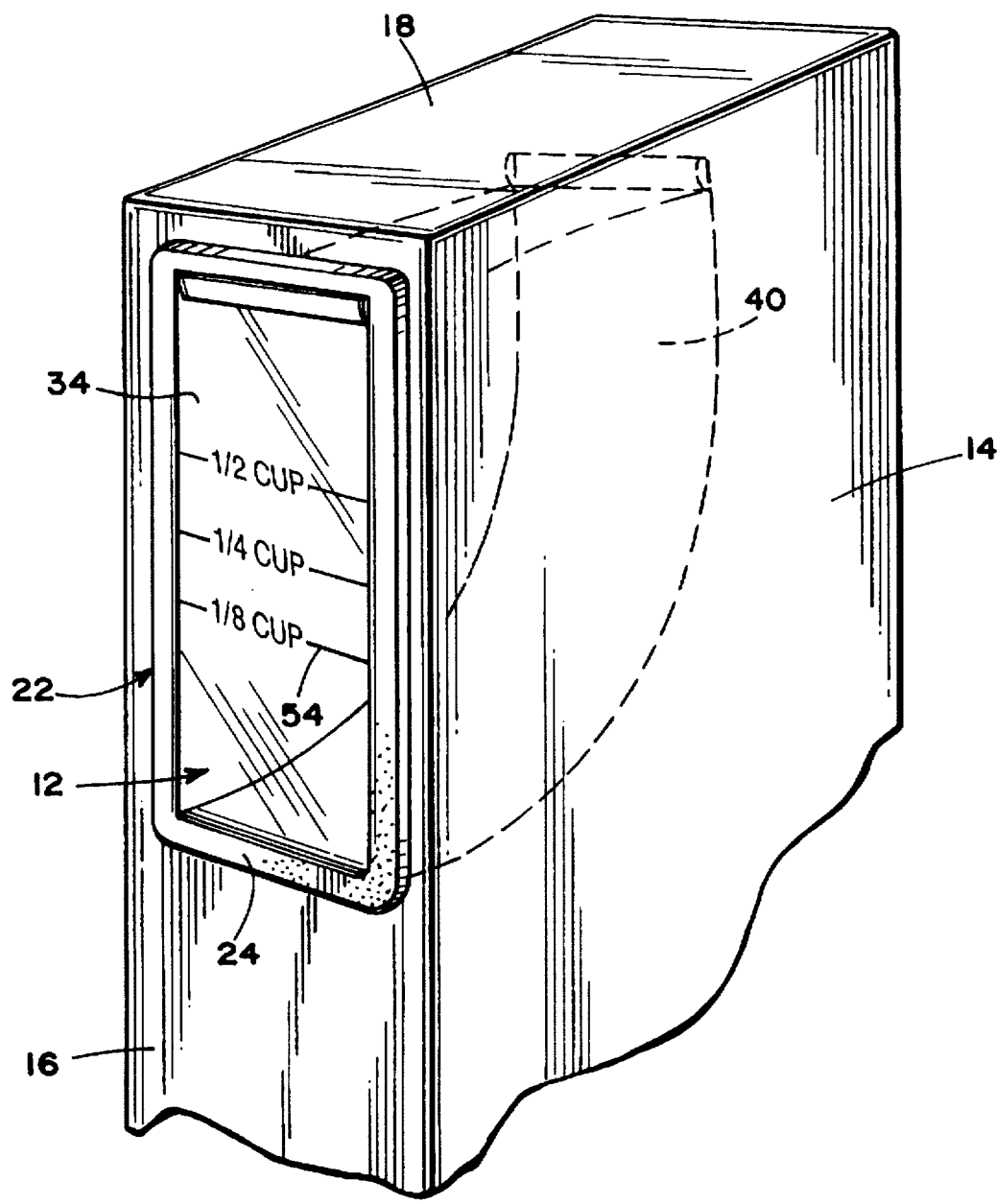
FIG. 1A is a partial perspective view of the box-like container and associated dispensing/measuring spout as shown in FIG. 1, but with the spout in a closed position.

In use, with the measuring/dispensing spout 12 in a closed position (FIG. 1A), the user will tilt or partially invert the box (to an extent dependent on the amount of contents remaining in the box) to the left as viewed in FIG. 1A thereby filling or partially filling the open topped hopper 30 with, for example, powdered detergent. If necessary, by manipulating the box in a back and forth movement, the user is able to add or remove material from the hopper, until just the desired amount is retained therein, aided by the indicia 54 on the front face 34. If, for example, too much material has entered the hopper 30, simply by tilting the box back to the right as viewed in FIG. 2, the user is able to transfer material out of the hopper 30 and back into the box 10. In any event, the user may, at all times, ascertain the amount of material within the hopper by reason of the clear face 34 and clear side surfaces 36, 38. In the event a multi-piece spout is utilized, at least the front face 34 should be made of clear or transparent material.

During the manipulation of the box to fill the hopper 30 with material to be dispensed, the snap projections 46 prevent the spout 12 from moving to an open position by reason of pressure exerted on the back wall 40 by the contents of the box. When the desired amount of material has been transferred to the hopper 30, and as already noted above, the user simply pulls the measuring/dispensing spout 12 to an open position (FIGS. 1 and 2) using the groove 50 in the upper edge 48 of the front face 34.

Figure 4:
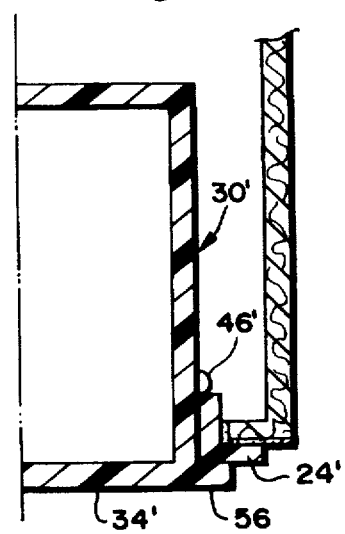
FIG. 4 is a partial top section similar in orientation to FIG. 3, but illustrating an alternative construction in accordance with the invention.

In an alternative arrangement, and with reference to FIG. 4, the front face 34' of the measuring/dispensing hopper 30' may be provided with side sealing flanges 56 (one shown in FIG. 4) which are adapted to abut against the peripheral frame 24'.

Figure 5:
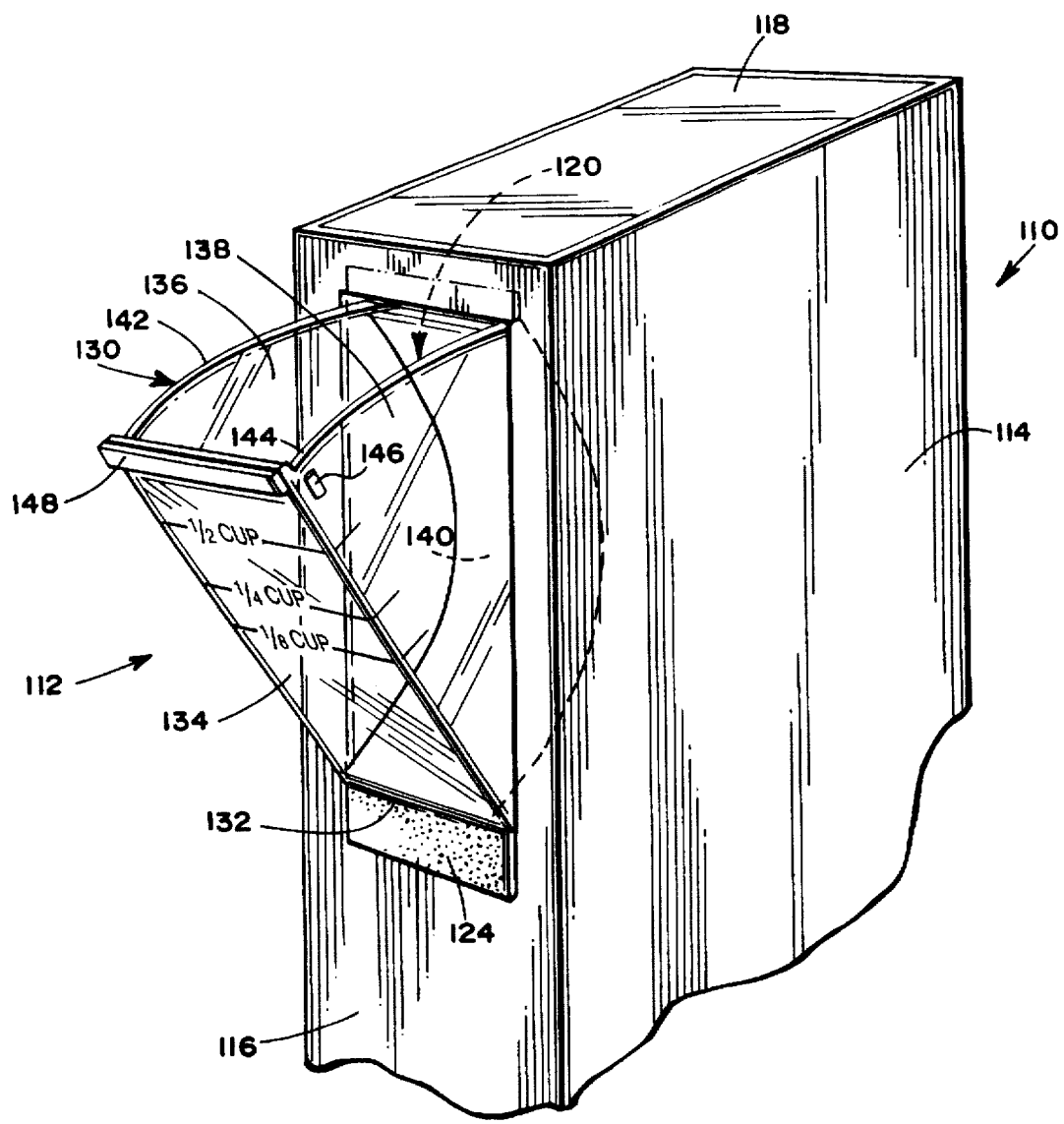
FIG. 5 is a partial perspective view of a box-like container and associated pouring/dispensing spout in accordance with a second exemplary embodiment of the invention, with the spout shown in an open position.
Figure 6:
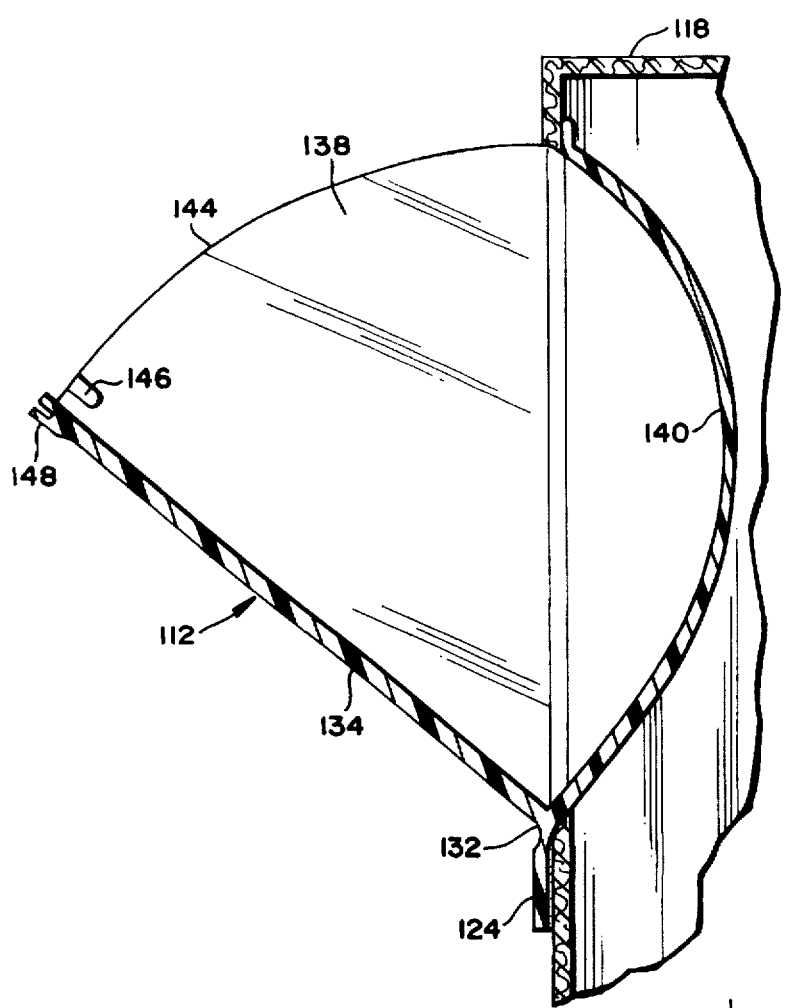
FIG. 6 is a partial side section of the box-like container and associated pouring/dispensing spout illustrated in FIG. 5.
Figure 7:
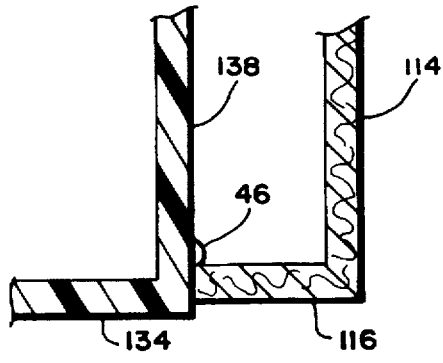
FIG. 7 is a partial top section of the box-like container and associated pouring/dispensing spout as shown in FIGS. 5 and 6, but with the spout shown in a closed position.

Turning to FIGS. 5 through 7, a tilt-out, measuring/ dispensing spout in accordance with a second exemplary embodiment is illustrated. For convenience, reference numerals similar to those utilized in connection with FIGS. 1-3, but with a prefix "1", have been used in FIGS. 5-7 to indicate corresponding elements. Thus, the box 110 includes side panels 114 (one shown), end panels 116 (one shown), a top panel 118 and a bottom panel (not shown). The tilt-out measuring/dispensing spout 112 is seated within a rectangular die-cut opening 120 formed in the end panel 116.

In accordance with this second exemplary embodiment, the peripheral frame 22 has been replaced by a lower hinge leaf 124, to which the measuring/dispensing hopper 130 is integrally hinged along the "living hinge" line 132. The hinge leaf 124 is cemented to the end panel 116 in essentially the same manner as the peripheral frame 22 in the first described exemplary embodiment.

The dispensing hopper 130 includes a front face 134, side faces 136, 138 and a rear face or wall 140. As in the previously described embodiment, the side faces 136, 138 are provided with curved upper edges 142, 144 which allow the dispensing hopper 130 to move between the open and closed positions about the living hinge 132, while engaging the upper edge of the die-cut opening 120. As in the previously described embodiment, the dispensing hopper 130 also includes snap projections 146 (one shown))indicia 154 along the front face 134, and a combined gripping bar/stop bar 148 (including groove 150) extending across the upper edge of the front face 134, and a stop edge 152 along the top of the backwall 140.

It will be appreciated that without the closed peripheral frame 22 of the type incorporated in the FIG. 1 embodiment, the measuring/dispensing spout 112 will pivot between open and closed positions, while frictionally engaging the edges of the end panel 116 which define the die-cut opening 120. The manner of operation of the measuring/dispensing spout 112 is otherwise identical to that described in connection with the embodiment illustrated in FIG. 1, and need not be repeated here.

Figure 8:
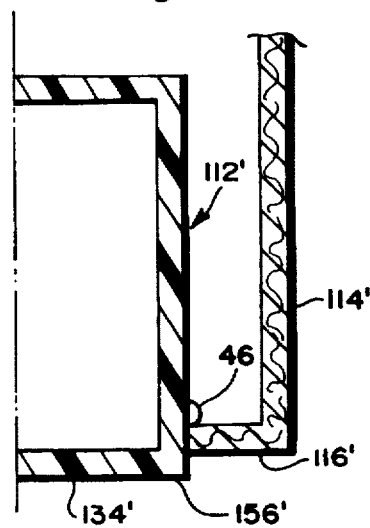
FIG. 8 is a partial top section similar in orientation to that shown in FIG. 7, but illustrating an alternative construction in accordance with the invention.

In FIG. 8, an alternative construction for the second exemplary embodiment is disclosed which incorporates the feature described above with respect to the alternative to the first exemplary embodiment as described in connection with FIG. 4. Thus, the front face 134' is provided with side sealing flanges 156' (one shown) which are adapted to abut the end panel 116 along the side edges of the die-cut opening 120.

Figure 9:
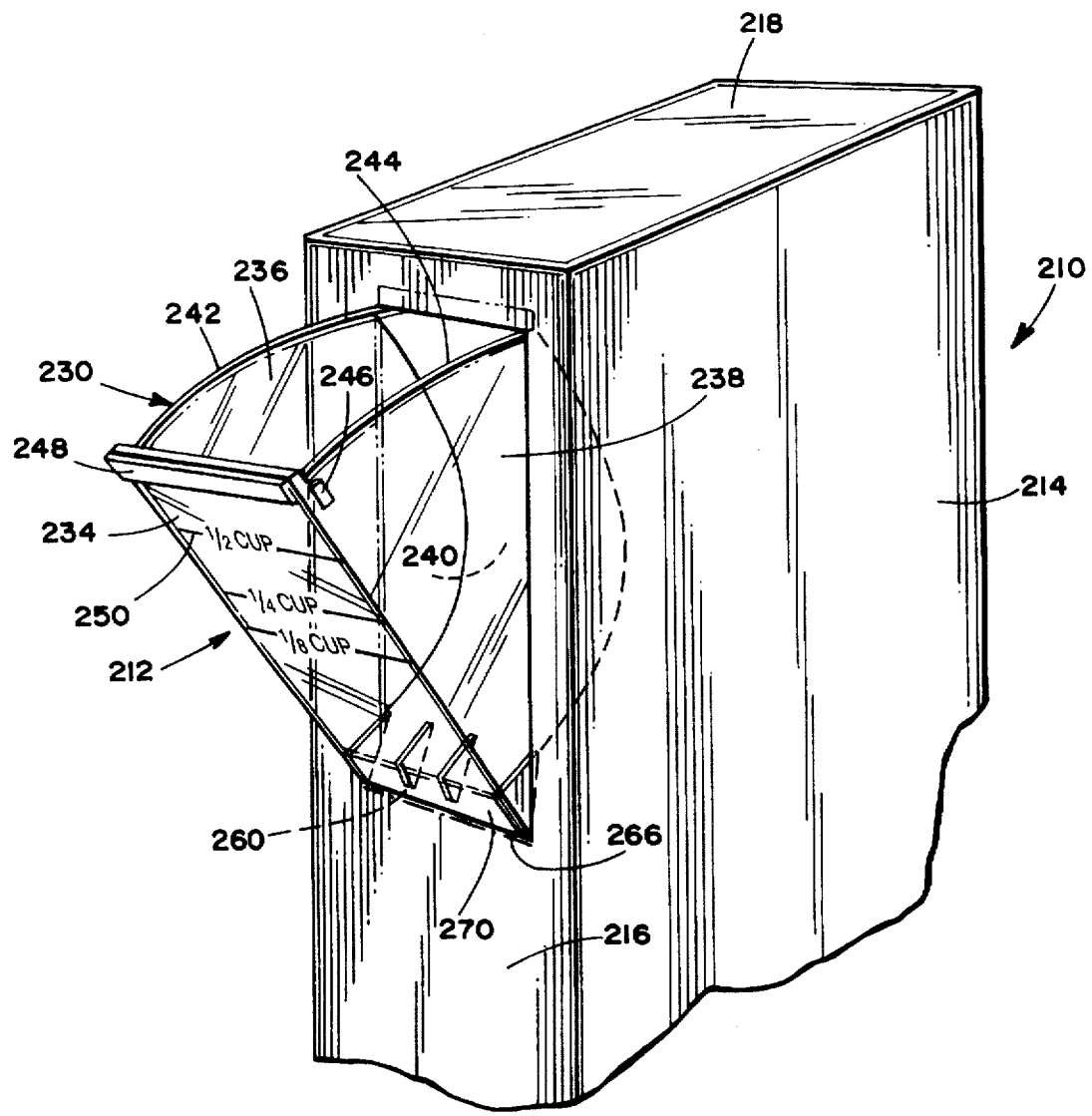
FIG. 9 is a partial perspective view of a box-like container and associated pouring/dispensing spout in accordance with a third exemplary embodiment of the invention, with the spout shown in an open position.

A third exemplary embodiment of the invention is illustrated in FIGS. 9–11, and again, similar reference numerals are utilized to designate corresponding components, but with the prefix "2" added. The description of elements which are identical to those in the previously described embodiments, however, need not be repeated. In this third exemplary embodiment, the die-cut opening 220 in the end panel 216 of the box 210 is formed so as to provide a flap panel 260 at the lower end of the opening, as defined by slits 262, 264 which extend below the opening 220, thus creating the flap 260 and a hinge line 266 extending across the lower end of the flap 260. This is best seen in FIG. 11.

In this alternative embodiment, the rear wall 240 is provided with a plurality (four in the embodiment shown) of generally triangular ribs 268 which extend downwardly from the rear wall 270 at a location generally adjacent a portion 270 of the front face 234 which extends below the juncture of wall 240 and front face 234. These ribs 268 have vertical front edges 272 which are spaced rearwardly of the portion 270 of front face 234 an amount corresponding substantially to the thickness of the flap 266. Thus, the spout 212 may be secured to the box 210 by sliding the flap (and cementing the flap) between the front face portion 270 and the ribs 268 as shown best in FIG. 10. In this way, the measuring/dispenser spout 212 can pivot between open and closed positions about the fold line 266. It should be noted here that the two outermost ribs 268 also serve to close gaps which would otherwise permit undesirable egress of material at the sides of the hopper 230, below the juncture of rear wall 240 and front face 234, when the spout 212 is in the open position.

The manner in which the measuring/dispenser 212 is utilized, is identical to those described hereinabove in connection with FIGS. 1-3 and 5-7.

It will be appreciated that the front face 234 of the spout 212 may be provided with side sealing flanges 254 which are adapted to abut the end panel 116 along the parallel vertical edges of the opening 220, as shown in FIG. 12.

With regard to all of the above described embodiments, the utilization of clear or substantially transparent material for the measuring/dispensing spout, and particularly the front face thereof, allows the user to precisely measure the amount of box contents to be dispensed from the hopper while the spout remains closed, and without relying blindly upon complex mechanical devices which move the rear wall of the hopper to predesignated locations to thereby change the effective volume of the hopper. Thus, the present invention provides a simpler and more reliable measuring/ dispensing device which is less costly to manufacture and which is more durable and reliable than prior art mechanisms of the type described hereinabove.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A plastic measuring and dispensing spout for use with a container which includes a panel having an opening therein, the measuring and dispensing spout comprising a front face, a pair of side faces and a rear face, formed to provide an open-topped hopper, said rear face being curved and intersecting said front face at a lower end thereof, and an integral frame for mounting said spout in the opening of the panel, said frame including flat outer surfaces adapted to surround the opening, said open-topped hopper pivotally secured to said integral frame at a lower edge of said open-topped hopper, along an integral living hinge, said frame including parallel side angle portions perpendicular to said flat outer surfaces and adapted to extend into said opening; and wherein said front face of said open-topped hopper includes a combined gripping bar and stop bar extending across an upper edge thereof and above said opening, said combined gripping bar and stop bar including an upwardly opening groove across the upper edge of said front face.

2. The measuring and dispensing spout of claim 1 wherein said pair of side faces are each provided on exterior surfaces thereof with a snap projection for releaseably holding said open-topped hopper in said closed position.

3. The measuring and dispensing spout of claim 1 wherein volumetric indicia extend along at least one of said side faces.

4. A dispensing box comprising a pair of side panels, a pair of end panels, and top and bottom panels, one of said panels having an opening formed therein; and a one-piece, substantially transparent plastic measuring and dispensing spout secured in said opening, said measuring and dispensing spout comprising a front face, a pair of side faces and a curved rear face, formed to provide an open-topped hopper, and including integral means for mounting said spout in said opening of said one of said panels for pivoting movement between open and closed positions; wherein said integral means comprises a frame surrounding and seated within said opening, said open-topped hopper pivotally secured to said frame at a lower edge of said open-topped hopper, along an integral, living hinge; and wherein said front face of said open-topped hopper includes a combined gripping bar and stop bar extending across an upper edge thereof and above said opening, said combined gripping bar and stop bar also including an upwardly opening groove across the upper edge of said front face.

5. The measuring and dispensing spout of claim 4 wherein said pair of side faces are each provided on exterior surfaces thereof with a snap projection for releaseably holding said open-topped hopper in said closed position.

6. The measuring and dispensing spout of claim 4 wherein said combined gripping bar and stop bar extends above an upper edge of said opening to thereby provide a stop surface preventing said front face from entering said box when the spout is moved to the closed position.

7. The measuring and dispensing spout of claim 4 wherein said curved rear face includes an upper substantially straight edge which prevents said curved rear face from exiting said box when the spout is moved to the open position.

8. The measuring and dispensing spout of claim 4 wherein volumetric indicia extend along at least one of said side faces.

\* \* \* \* \*